(12) United States Patent
Mutsuo et al.

(10) Patent No.: US 9,153,042 B2
(45) Date of Patent: Oct. 6, 2015

(54) IMAGE PROCESSING APPARATUS

(71) Applicant: KYOCERA Document Solutions Inc.

(72) Inventors: Toshiaki Mutsuo, Osaka (JP); Masaki Baba, Osaka (JP)

(73) Assignee: Kyocera Document Solutions Inc. (JP)

( * ) Notice: Subject to any disclaimer, the term of this patent is extended or adjusted under 35 U.S.C. 154(b) by 69 days.

(21) Appl. No.: 14/086,378

(22) Filed: Nov. 21, 2013

(65) Prior Publication Data

US 2014/0177958 A1 Jun. 26, 2014

(30) Foreign Application Priority Data

Nov. 27, 2012 (JP) ................. 2012-258801

(51) Int. Cl.
*G06K 9/00* (2006.01)
*G06T 9/00* (2006.01)
*G06K 9/34* (2006.01)

(52) U.S. Cl.
CPC ............ *G06T 9/007* (2013.01); *G06K 9/00442* (2013.01); *G06K 9/342* (2013.01); *G06K 2209/01* (2013.01)

(58) Field of Classification Search
CPC .......... G06K 9/00442; G06K 9/00456; G06K 9/2054; G06K 9/325; G06K 9/3283; G06K 9/342; G06K 9/34; G06K 9/344; G06K 9/38; G06K 9/4652; G06K 9/72; H04N 1/387; H04N 1/40062; H04N 1/4092; H04N 1/41; H04N 1/413; H04N 1/56; H04N 1/58; H04N 1/6072; H04N 1/642; G06T 3/0031; G06T 5/00; G06T 5/006; G06T 5/007; G06T 5/40; G06T 7/0081; G06T 7/0083; G06T 7/0085; G06T 7/408; G06T 9/002; G06T 9/007; G06T 11/60; G06T 2207/10024; G06T 2207/20012; G06T 2207/20021; G09G 5/02
See application file for complete search history.

(56) References Cited

U.S. PATENT DOCUMENTS

| | | | | |
|---|---|---|---|---|
| 5,872,864 | A * | 2/1999 | Imade et al. | 382/176 |
| 7,133,559 | B2 * | 11/2006 | Yamazaki | 382/199 |
| 8,463,032 | B2 * | 6/2013 | Matsuoka | 382/166 |
| 2005/0180645 | A1 * | 8/2005 | Hasegawa et al. | 382/239 |
| 2008/0123945 | A1 | 5/2008 | Andrew et al. | |
| 2010/0157340 | A1 | 6/2010 | Chen et al. | |

FOREIGN PATENT DOCUMENTS

| | | |
|---|---|---|
| EP | 1357508 | 10/2003 |
| JP | H10-093957 | 4/1998 |
| JP | 2005-500709 | 1/2005 |
| JP | 2007-318520 | 12/2007 |
| JP | 2010-011450 | 1/2010 |
| JP | 2010-157899 | 7/2010 |

* cited by examiner

Primary Examiner — Jose Couso

(57) ABSTRACT

In an image processing apparatus, regarding plural character areas in the character image of each color, an image compressing unit 6 includes one of the character areas from which a distance to another one of the character areas is either equal to or larger than a predetermined threshold value into a character image other than the character image in which the other one of the character areas is included, and compresses image data of the other one of the character areas separately from other image data.

4 Claims, 5 Drawing Sheets

CHARACTER GROUP #1

111

CHARACTER GROUP #2

112

CHARACTER GROUP #3

113

CHARACTER GROUP #4

114

IMAGE PROCESSING APPARATUS

CROSS-REFERENCE TO RELATED APPLICATIONS

This application relates to and claims priority rights from Japanese Patent Application No. 2012-258801, filed on Nov. 27, 2012, the entire disclosures of which are hereby incorporated by reference herein.

BACKGROUND

1. Field of the Present Disclosure

The present disclosure relates to an image processing apparatus.

2. Description of the Related Art

An image processing apparatus separates characters and a background image from an original image, and compresses image data of the characters and image data of the background image separately.

When a highly compressed PDF file is generated from image data, another image processing apparatus unifies plural character areas of a single character color as one image layer to reduce the number of image layers, and consequently reduces a total amount of property information of the image layers. Further, when a highly compressed PDF file is generated from image data, another image processing apparatus unifies character areas and also unifies property information thereof if an increment of the number of pixels due to the unification is either equal to or less than a predetermined threshold value.

However, in the aforementioned manner where character areas are unified, when each character area is small, due to a lot of blank parts between character areas included in a character plane (i.e. an aforementioned image layer of characters), the size of the character plane is large, and consequently it takes long time for a decompression process when compressed image data is decompressed to original image data.

SUMMARY

An image processing apparatus according to an aspect of the present disclosure includes an edge image generating unit, a connection pixel extracting unit, a binary image generating unit, a background image generating unit, and an image compressing unit. The edge image generating unit is configured to detect edges in an original image and generate an edge image formed by the detected edges. The connection pixel extracting unit is configured to extract connection pixel sets in the edge image. The binary image generating unit is configured to classify the connection pixel sets by colors and generate respective character images which are binary images corresponding to the colors. The background image generating unit is configured to generate a background image of the original image on the basis of the character images. The image compressing unit is configured to compress image data of the character images and image data of the background image using respective different compressing methods. Regarding plural character areas in the character image of each color, the image compressing unit is further configured to include one of the character areas from which a distance to another one of the character areas is either equal to or larger than a predetermined threshold value into a character image other than the character image in which the other one of the character areas is included, and to compress image data of the other one of the character areas separately from other image data.

Therefore, character planes (i.e. character images) are configured so that it takes short time for a decompression process when compressed image data is decompressed to original image data.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
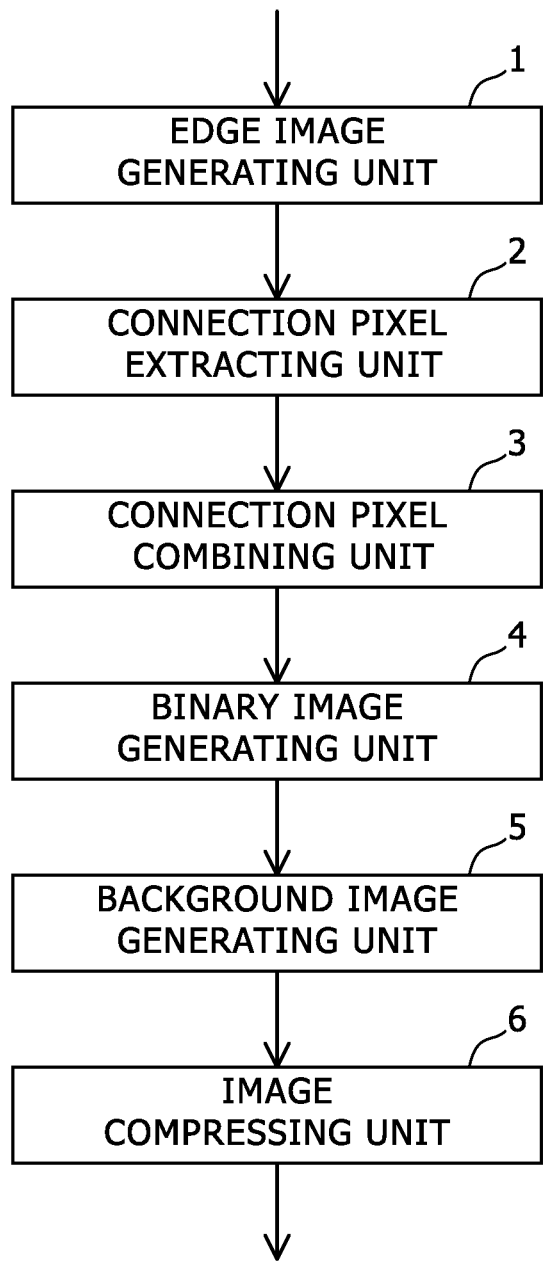
FIG. 1 shows a block diagram which indicates a configuration of an image processing apparatus according to an embodiment of the present disclosure.

FIG. 1 shows a block diagram which indicates a configuration of an image processing apparatus according to an embodiment of the present disclosure. The image processing apparatus shown in FIG. 1 is formed, for example, with an ASIC (Application Specific Integrated Circuit), a computer, and so forth. Image data of sorts of images such as an original image is stored in a RAM (Random Access Memory), a non volatile memory, or the like. The ASIC and a processor in the computer forms processing units mentioned below.

An edge image generating unit 1 detects edges in an original image, and generates an edge image formed by the detected edges. In this embodiment, the edge image is an image which indicates positions of pixels on a high density side of the detected edges, and a binary image. Therefore, values of the pixels on a high density side of the detected edges are 1, values of the other pixels are 0.

In this embodiment, the original image is a gradational color image, and the edge image generating unit 1 generates an image of only a luminance component of the original image, detects edges in the generated image, and generates the edge image formed by the detected edges.

A connection pixel extracting unit 2 extracts a connection pixel set in the edge image, and manages a series of connection pixels so as to enable them to be identified as a set. Therefore, when a connection pixel set and another connection pixel set are not connected, the connection pixel sets are managed so as to enable them to be identified as two different sets. A connection pixel set consists of either a single pixel or plural pixels which are concatenated to each other among the aforementioned pixels on the high density side (i.e. pixels with the pixel value of 1).

A connection pixel combining unit 3 detects the connection pixel sets to which the circumscribed rectangles are close to each other and groups the detected connection pixel sets as one connection pixel set. Therefore, if two connection pixel sets are grouped, then they are managed as one connection pixel set. For example, connection pixel sets are grouped if a predetermined condition is satisfied such as a condition that one of rectangles circumscribed to the connection pixel sets is overlapped to the other in a part or a condition that a distance between rectangles circumscribed to the connection pixel sets is shorter than a predetermined threshold value.

A binary image generating unit 4 classifies the connection pixel sets by colors of the connection pixel sets (i.e. colors in the original image) and generates respective character images corresponding to the colors. The character images are binary images. Here the character image is generated on the basis of connection pixel sets except for a connection pixel set which does not correspond to a character.

For example, regarding five connection pixel sets A to E, if connection pixel sets A and B in an original image have a first color, connection pixel set C in the original image has a second color (a different color from the first color), connection pixel sets D and E in an original image have a third color (a different color from the first and the second colors), then for the first color a character image is generated in which pixel values in positions of the connection pixel sets A and B are 1 and pixel values in the other positions are 0, for the second color a character image is generated in which pixel values in positions of the connection pixel set C are 1 and pixel values in the other positions are 0, and for the third color a character image is generated in which pixel values in positions of the connection pixel sets D and E are 1 and pixel values in the other positions are 0.

A background image generating unit 5 generates a background image of the original image on the basis of the aforementioned character images. Specifically, the background image generating unit 5 identifies positions of characters in the aforementioned character image (i.e. pixel positions on which pixel values are 1) on the basis of the character image, and generates a background image by changing pixel values of original image on the identified positions in the following manner.

For example, the background image generating unit 5 generates the background image by changing pixel values in a position of the character image (i.e. positions of pixels with the pixel value of 1 in the character image) in the original image to an average value of pixel values of the original image on at least a part of surrounding pixels of the rectangle.

Figure 2A:
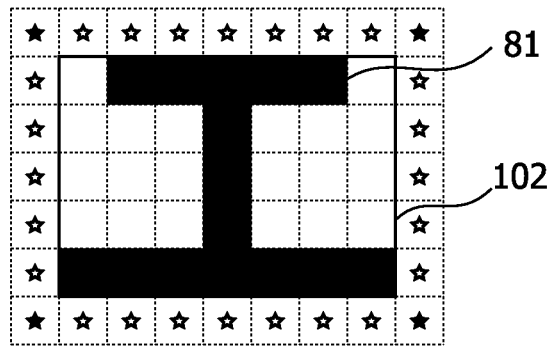
FIGS. 2A to 2C show diagrams which indicate examples of connection pixel sets extracted in the image processing apparatus shown in FIG. 1.
Figure 2B:
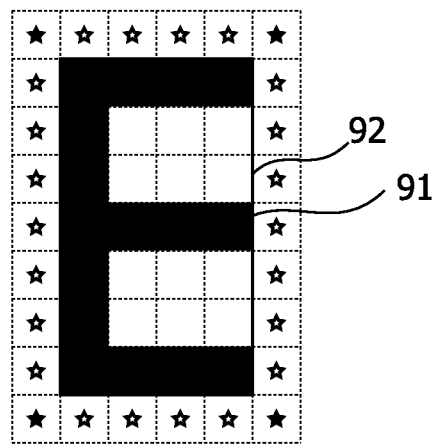
Figure 2C:
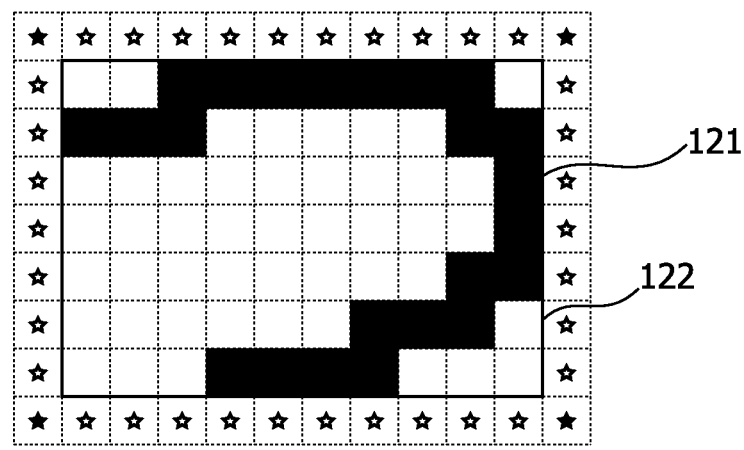

FIGS. 2A to 2C show diagrams which indicate examples of connection pixel sets extracted in the image processing apparatus shown in FIG. 1.

In an example shown in FIG. 2A, the original image includes a Japanese character. In this example, a connection pixel set 81 is detected, and a rectangle 102 circumscribed to the connection pixel set 81 is identified. In this example, on the basis of pixel values of the original image on pixels with star marks around the rectangle 102, pixel values of the background image in positions of this connection pixel set 81 are determined.

In an example shown in FIG. 2B, the original image includes a character "E". In this example, a connection pixel set 91 is detected, and a rectangle 92 circumscribed to the connection pixel set 91 is identified. In this example, on the basis of pixel values of the original image on pixels with star marks around the rectangle 92, pixel values of the background image in positions of this connection pixel set 91 are determined.

In an example shown in FIG. 2C, the original image includes another Japanese character. In this example, a connection pixel set 121 is detected, and a rectangle 122 circumscribed to the connection pixel set 121 is identified. In this example, on the basis of pixel values of the original image on pixels with star marks around the rectangle 122, pixel values of the background image in positions of this connection pixel set 121 are determined.

It should be noted that the background image generating unit 5 may generate the background image by changing pixel values in a position of the character image in the original image to an average value of pixel values of the original image on all of surrounding pixels of the aforementioned rectangle.

Further, the background image generating unit 5 may generate the background image by changing pixel values in a position of the character image in the original image to an average value of pixel values of the original image on four pixels (pixels with black star marks in FIGS. 2A to 2C) positioned at four corners among surrounding pixels of the aforementioned rectangle.

If there are groups of connection pixel sets, then the binary image generating unit 4 classifies the groups of connection pixel sets by colors of the group of connection pixel sets, and generates character images corresponding to the colors. In this process, if a color of a group of connection pixel sets is identical to a color of another ungrouped connection pixel set, then the group and the ungrouped connection pixel set are included in a same character image. In addition, for the grouped connection pixel sets, the background image generating unit 5 generates the background image by changing pixel values in a position of the character image in the original image to an average value of pixel values of the original image on at least a part of surrounding pixels of a rectangle circumscribed to the whole grouped connection pixel sets.

An image compressing unit 6 compresses image data of the aforementioned character images and image data of the background image using respective different compressing methods. For example, image data of the character image is compressed using MMR (Modified Modified READ) method, and image data of the background image is compressed using JPEG (Joint Photographic Experts Group) method. It should be noted that there are pieces of data of which the number is same as the number of the colors, and respective ones of the pieces of data are compressed. Further, a value of each color is managed so as to be related to compressed image data of that color.

Further, regarding plural character areas in the character image of each color, the image compressing unit 6 includes one of the character areas from which a distance to another one of the character areas is either equal to or larger than a predetermined threshold value into a character image other than the character image in which the other one of the character areas is included, and compresses image data of the other one of the character areas separately from other image data (i.e. as image data of an independent character plane).

This character area is an area inside of the aforementioned rectangle (e.g. the rectangle 102, 92, or 122 in FIGS. 2A to 2C), and the distance between the character areas is which one of a distance in a primary scanning direction and a distance in a secondary scanning direction longer than the other.

Further, the image compressing unit 6 classifies plural character areas into character groups so as to make the character areas between which a distance is short belong to one character group and make the character areas between which a distance is long belong to respective different character groups on the basis of the threshold value, and separately compresses the character groups as respective character planes.

Further, in this embodiment, the image compressing unit 6 generates a highly compressed PDF file using the compressed image data.

In the following part, a behavior of the aforementioned image processing apparatus is explained.

Firstly, the edge image generating unit 1 detects edges in an original image and generates an edge image formed by the detected edges.

Subsequently, the connection pixel extracting unit 2 extracts a connection pixel set in the edge image, and manages a series of connection pixels so as to enable them to be identified as one set.

The connection pixel combining unit 3 identifies positions and sizes of respective rectangles circumscribed to the connection pixel sets extracted by the connection pixel extracting unit 2, detects the connection pixel sets to which the circumscribed rectangles are close to each other and groups the detected connection pixel sets as one connection pixel set if the circumscribed rectangles are close to each other.

Subsequently, the binary image generating unit 4 classifies the connection pixel sets by colors of the connection pixel sets (i.e. colors in the original image) and generates respective character images corresponding to the colors.

In the aforementioned manner, respective color images of colors are generated.

Subsequently, the background image generating unit 5 generates a background image of the original image on the basis of the aforementioned character images. As mentioned, the background image generating unit 5 generates the background image by changing pixel values in a position of the character image in the original image to an average value of pixel values of the original image on at least a part of surrounding pixels of the rectangle.

In the aforementioned manner, a background image is generated.

The image compressing unit 6 compresses image data of the aforementioned character images and image data of the background image using respective different compressing methods.

Specifically, as mentioned, the image compressing unit 6 classifies plural character areas into character groups so as to make the character areas between which a distance is short belong to one character group and make the character areas between which a distance is long belong to respective different character groups on the basis of the threshold value, and separately compresses the character groups as respective character planes. Thus, one character plane (i.e. one character image) generated of each color by the binary image generating unit 4 is divided into plural character planes.

Figure 3:
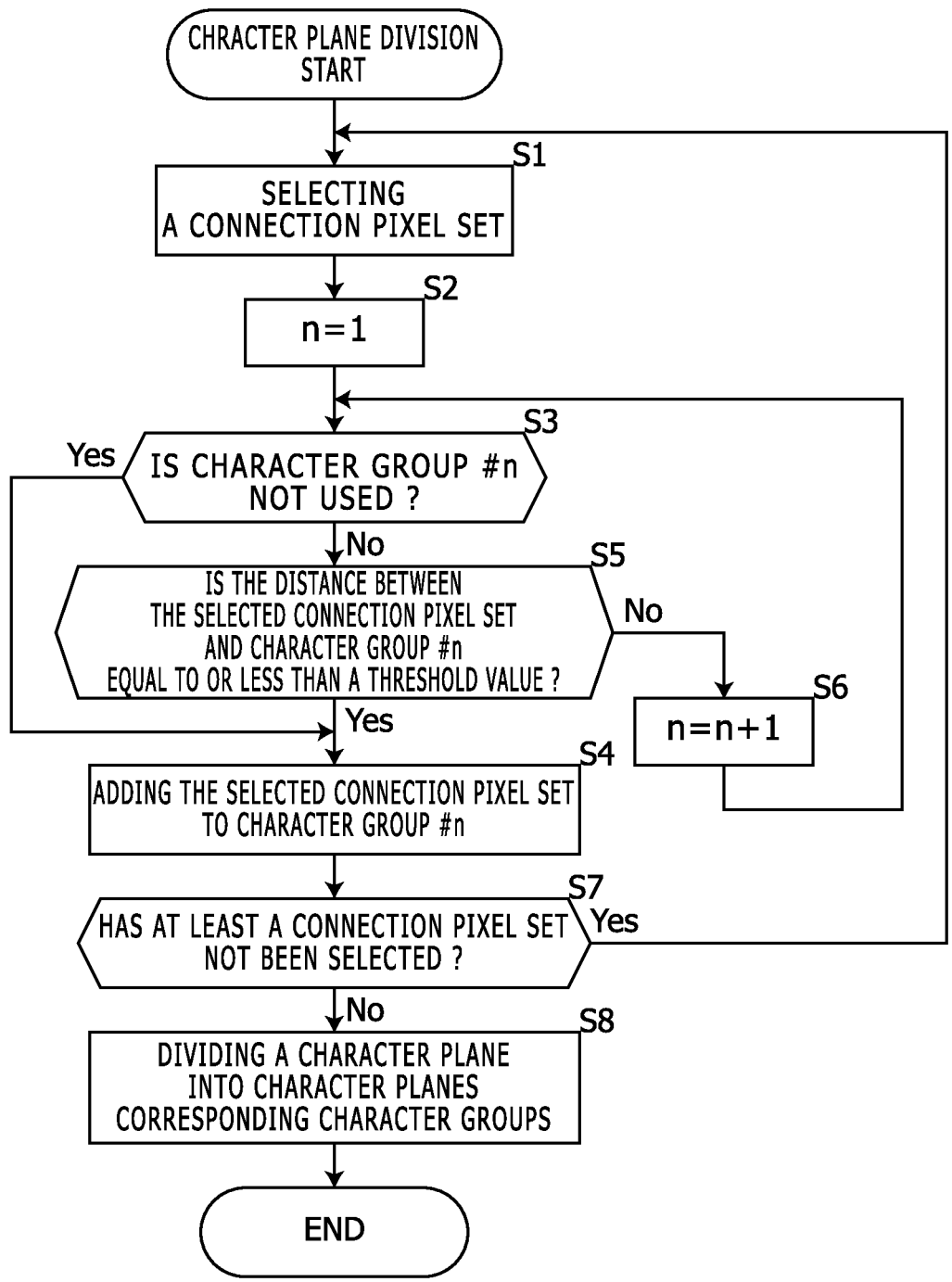
FIG. 3 shows a flowchart which explains dividing a character plane by the image compressing unit in FIG. 1.

FIG. 3 shows a flowchart which explains dividing a character plane by the image compressing unit in FIG. 1.

Firstly, the image compressing unit 6 identifies connection pixel sets of characters in one character plane, and identifies, as a character area, an area inside of the aforementioned rectangle corresponding to each one of the connection pixel sets.

Subsequently, the image compressing unit 6 selects one of the identified connection pixel sets (Step S1), and sets a value of a variable n which indicates a character group number as 1 (Step S2).

The image compressing unit 6 maintains character group property data corresponding to each one of the character groups. The character group property data includes (a) a character group number, (b) a connection pixel set list that indicates connection pixel sets which belong to this character group, (c) position information that indicates a position of this character group (e.g. positions information of two corners on a diagonal line of a rectangle circumscribed to all connection pixel sets included in the character group), and so forth.

The image compressing unit 6 identifies whether or not a character group #n which has a character group number n is unused (Step S3). Specifically, for example, the image compressing unit 6 identifies whether or not character group property data of the character group #n exists, and determines that the character group #n is unused if character group property data of the character group #n does not exist.

If the image compressing unit 6 identifies that the character group #n is unused, then the image compressing unit 6 generates character group property data, adds the connection pixel set selected in Step S1 into the character group #n, and updates the character group property data of the character group #n (Step S4).

On the other hand, if the image compressing unit 6 identifies that the character group #n is not unused, then the image compressing unit 6 identifies whether or not the distance between the selected connection pixel set and the character group #n is either equal to or less than a predetermined threshold value (e.g. 900 pixels) (Step S5).

In this process, the distance between a rectangle circumscribed to the selected connection pixel set and a rectangle circumscribed to the character group #n (e.g. which of the distance in a primary scanning direction and the distance in a secondary scanning direction longer than the other) is identified, and the identified distance is compared with a predetermined threshold value.

If the distance between the selected connection pixel set and the character group #n is either equal to or less than a predetermined threshold value, then the image compressing unit 6 adds the connection pixel set selected in Step S1 into the character group #n, and updates character group property data of the character group #n (Step S4).

On the other hand, if the distance between the selected connection pixel set and the character group #n is neither equal to nor less than the predetermined threshold value, then the image compressing unit 6 increases the value of the variable n by 1 (Step S6), and performs the process from Step S3 for the next character group #n+1.

Due to this process, if there is a character group located near the connection pixel set selected in Step S1, then this connection pixel set is added to this character group, and otherwise if there are not any character groups located near this connection pixel set, then this connection pixel set is added to a new character group.

Subsequently, after adding the connection pixel set selected in Step S1 into any character group, the image compressing unit 6 identifies whether or not an unselected connection pixel set (i.e. which does not belong to any character groups) exists (Step S7).

If an unselected connection pixel set exists, then returning to Step S1, the image compressing unit 6 selects an unselected connection pixel set and performs the same process for the selected connection pixel set.

In this manner, connection pixel sets of all characters in an original character plane are classified into character groups.

Figure 4:
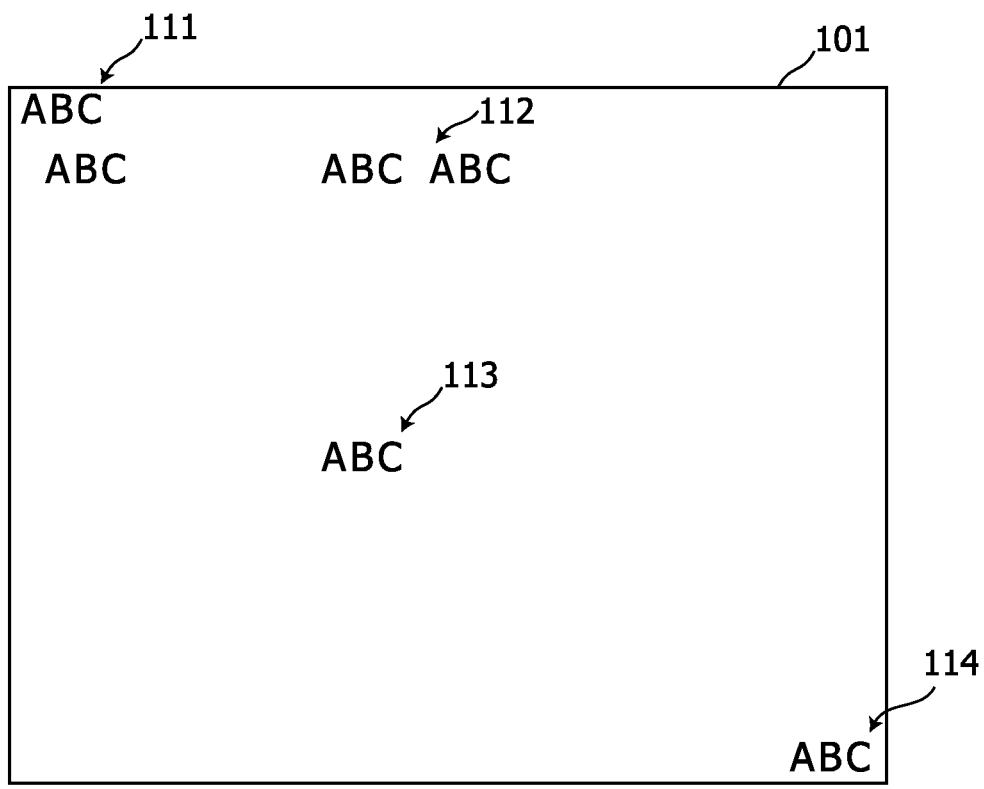
FIG. 4 shows a diagram which indicates an example of an original character plane (a character image)
Figure 5:
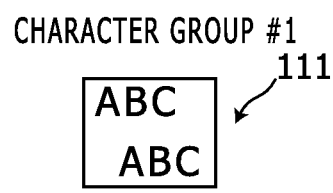
FIG. 5 shows a diagram which indicates a character group detected in the character plane shown in FIG. 4.
Figure 5:
Figure 5:
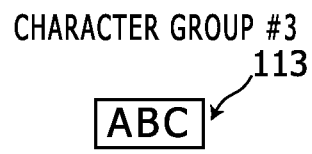
Figure 5:
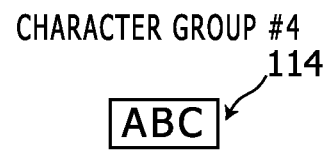

FIG. 4 shows a diagram which indicates an example of an original character plane (a character image). FIG. 5 shows a diagram which indicates a character group detected in the character plane shown in FIG. 4. For example, if a character plane 101 as shown in FIG. 4 exists, characters located closely to each other are classified into a same character group. As shown in FIG. 5, therefore, six characters "ABCABC" 111 belong to a character group #1, six characters "ABCABC" 112 belong to a character group #2, three characters "ABC" 113 belong to a character group #3, and three characters "ABC" 114 belong to a character group #4.

Subsequently, the image compressing unit 6 generates character planes corresponding to the character groups, and replaces the original character plane with the generated character planes (Step S8).

According to this manner, character images and a background image are separated from an original image, the character images are divided into plural character planes, and respective pieces of image data of the character planes are separately compressed.

In the aforementioned embodiment, regarding plural character areas in the character image of each color, the image compressing unit 6 includes one of the character areas from which a distance to another one of the character areas is either equal to or larger than a predetermined threshold value into a character image other than the character image in which the other one of the character areas is included, and compresses image data of the other one of the character areas separately from other image data, as one character plane.

Therefore, character planes (i.e. character images) are configured so as to perform a decompression process in short time when compressed image data is decompressed to original image data.

The description has been presented for purposes of illustration and description, and is not intended to be exhaustive or limited to the present disclosure.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
   an edge image generating unit configured to detect edges in an original image and to generate an edge image formed by the detected edges;
   a connection pixel extracting unit configured to extract connection pixel sets in the edge image;
   a binary image generating unit configured to classify the connection pixel sets by colors and generate respective character images which are binary images corresponding to the colors;
   a background image generating unit configured to generate a background image of the original image on the basis of the character images; and
   an image compressing unit configured to compress image data of the character images and image data of the background image using respective different compressing methods;
   wherein regarding plural character areas in the character image of each color, the image compressing unit is further configured to include one of the character areas from which a distance to another one of the character areas is either equal to or larger than a predetermined threshold value into a character image other than the character image in which the other one of the character areas is included, and to compress image data of the other one of the character areas separately from other image data; wherein the image compressing unit is further configured to classify the plural character areas into character groups so as to make the character areas between which a distance is short belong to one character group and make the character areas between which a distance is long belong to respective different character groups on the basis of the threshold value, and to separately compress the character groups as respective pieces of image data of character images.

2. The image processing apparatus according to claim 1, wherein the character area is an area inside of a rectangle circumscribed to the connection pixel set, and the distance between the character areas is which one of a distance in a primary scanning direction and a distance in a secondary scanning direction longer than the other.

3. The image processing apparatus according to claim 1, wherein the image compressing unit is further configured to generate a highly compressed PDF file using the compressed image data.

4. The image processing apparatus according to claim 1, further comprising a connection pixel combining unit configured to detect the connection pixel sets to which the circumscribed rectangles are close to each other and to group the detected connection pixel sets as one connection pixel set.

\* \* \* \* \*